Figure 1:
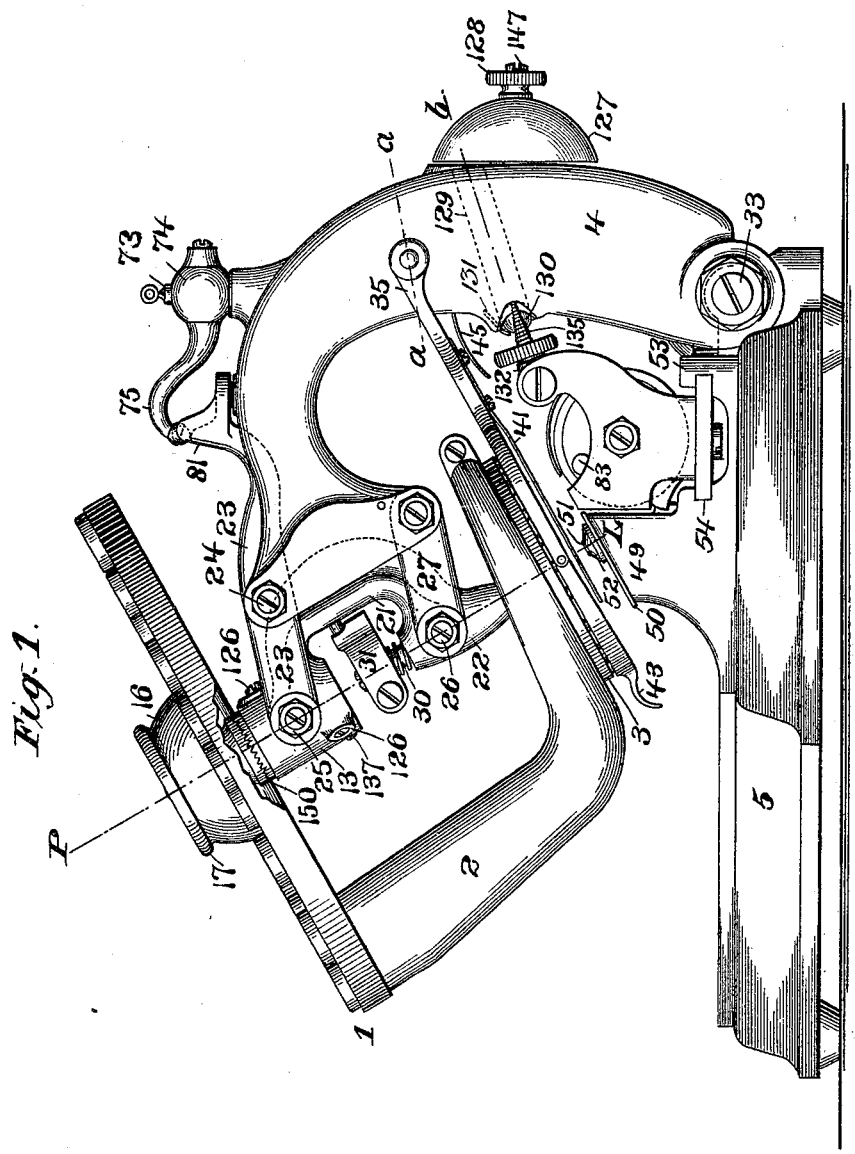

No. 640,208. Patented Jan. 2, 1900.
F. LAMBERT.
TYPE WRITER.
(Application filed Apr. 2, 1898.)

(No Model.) 8 Sheets—Sheet 1.

WITNESSES:
Geo H Botts
Chas A. Beard

INVENTOR
Frank Lambert
BY
Edith J. Griswold
ATTORNEY.

No. 640,208. Patented Jan. 2, 1900.
F. LAMBERT.
TYPE WRITER.
(Application filed Apr. 2, 1898.)

(No Model.) 8 Sheets—Sheet 3.

WITNESSES:
Geo H Botts
Chas A. Beard

INVENTOR
Frank Lambert
BY
Edith J. Griswold
ATTORNEY

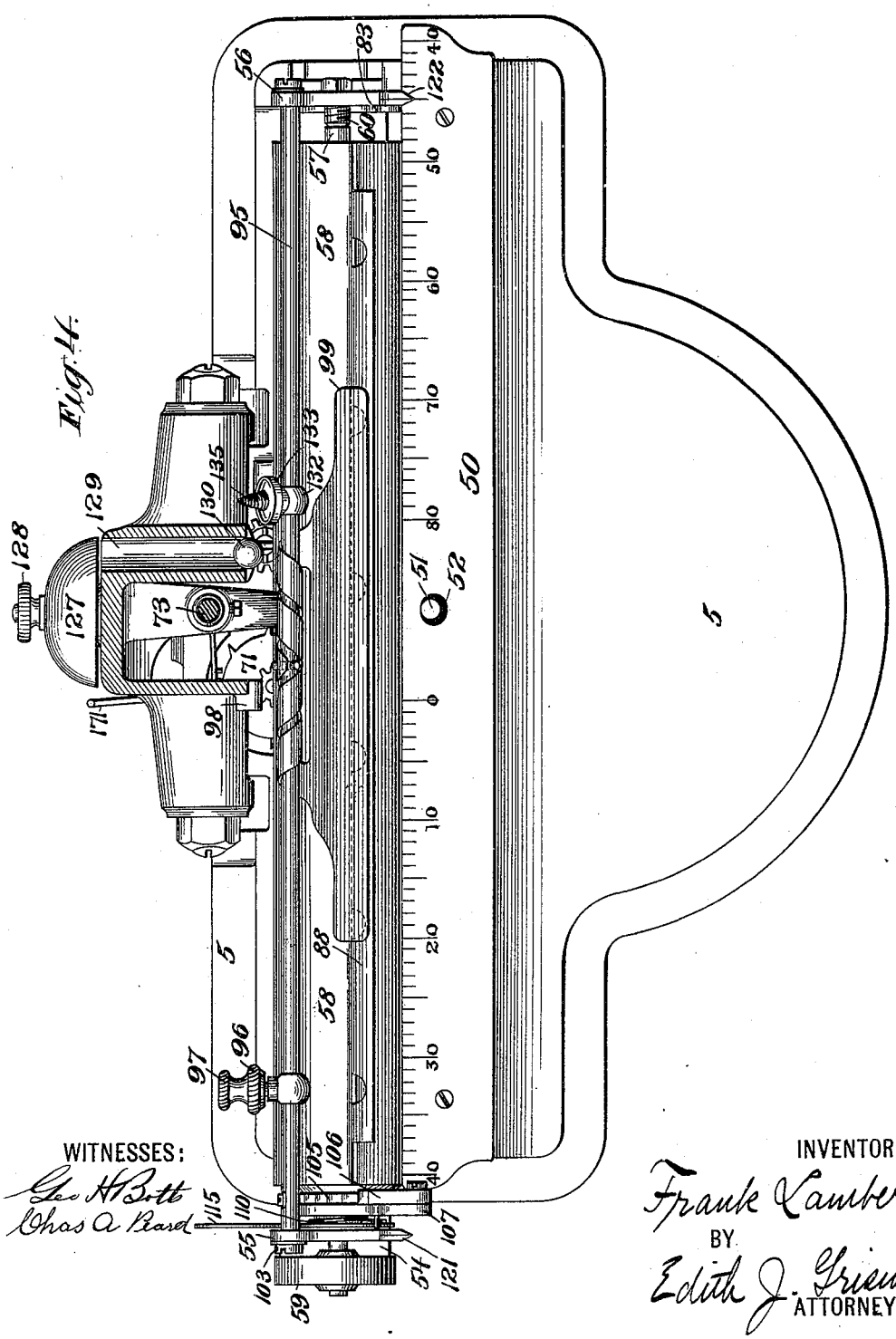

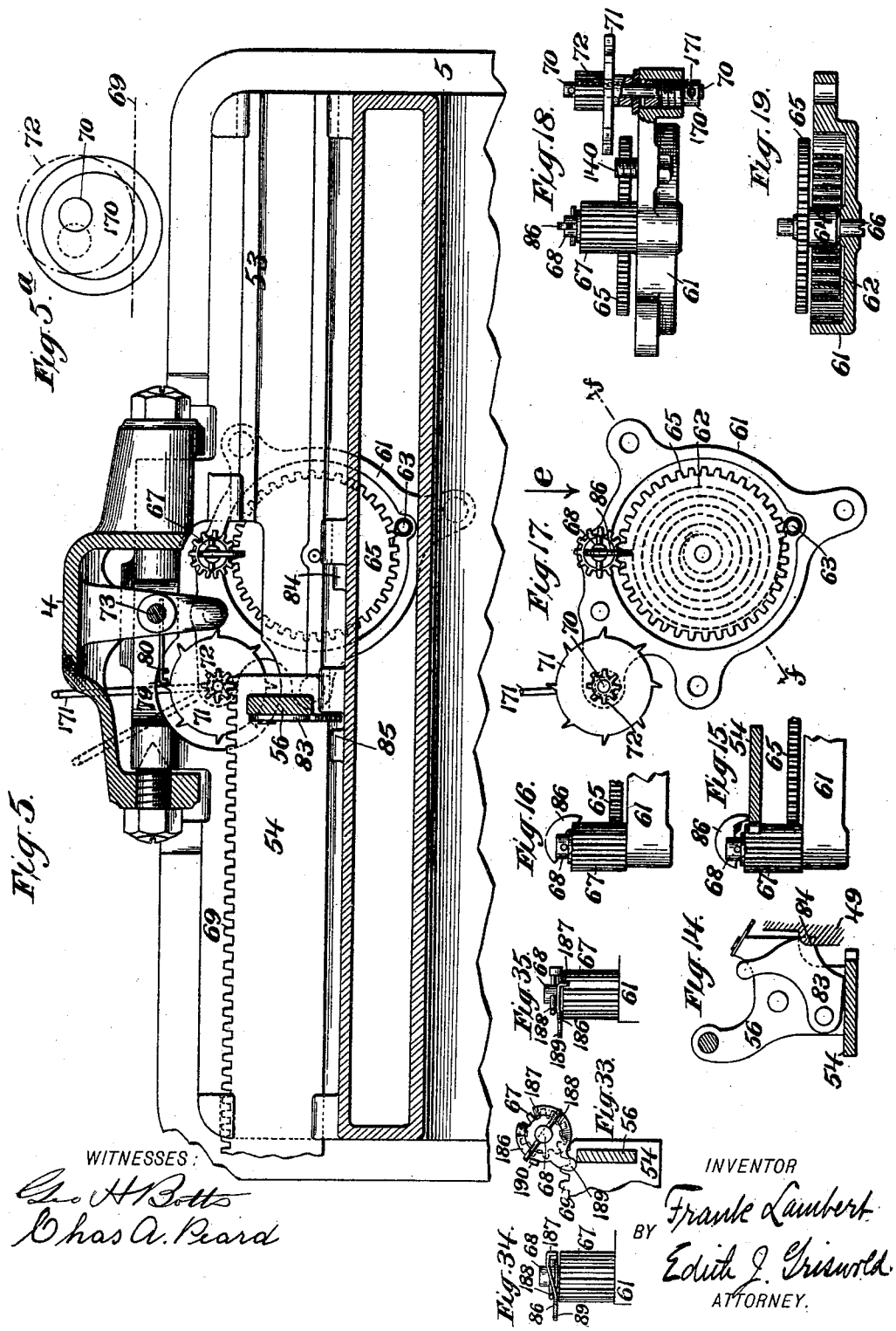

No. 640,208. Patented Jan. 2, 1900.
F. LAMBERT.
TYPE WRITER.
(Application filed Apr. 2, 1898.)
(No Model.) 8 Sheets—Sheet 6.
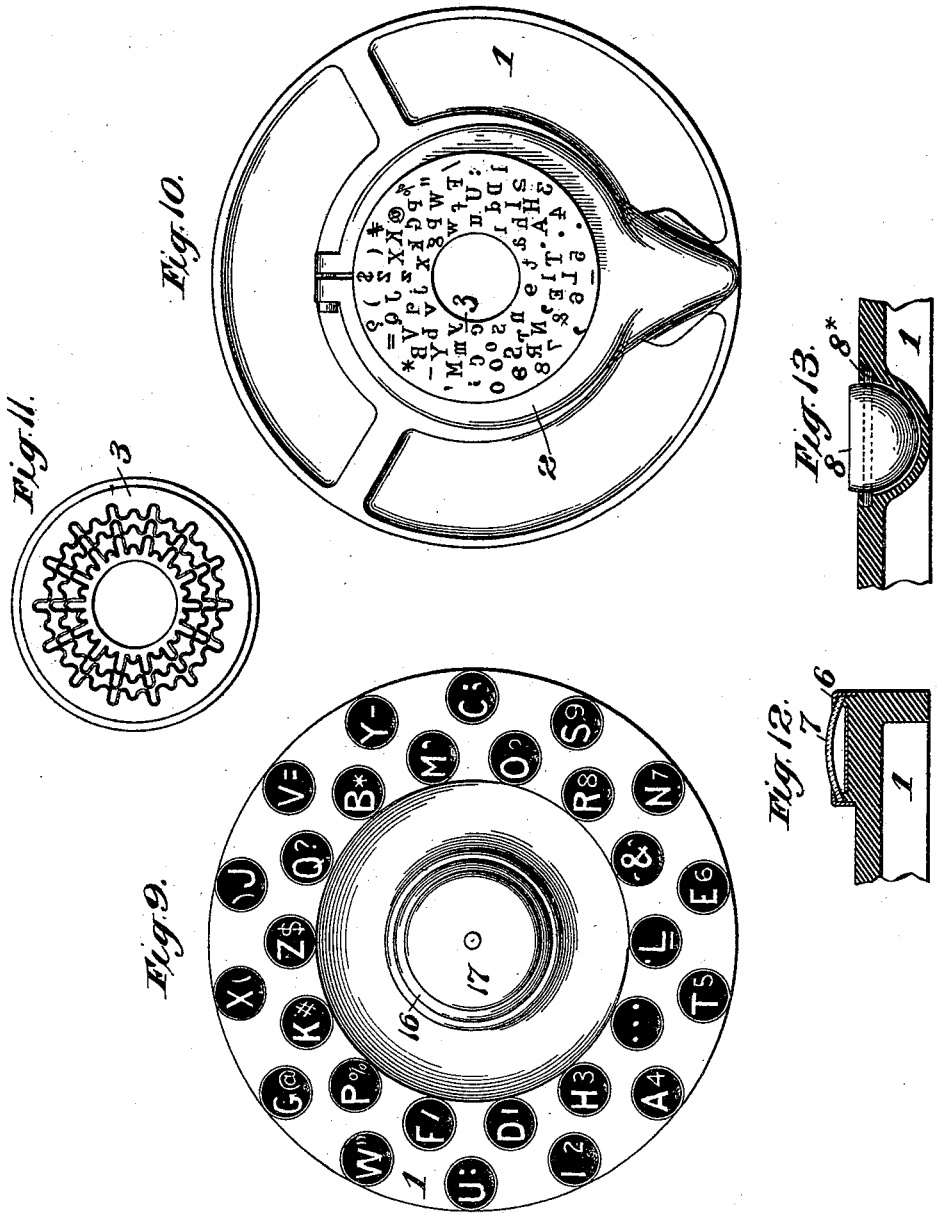

No. 640,208. Patented Jan. 2, 1900.
F. LAMBERT.
TYPE WRITER.
(Application filed Apr. 2, 1898.)
(No Model.) 8 Sheets—Sheet 7.
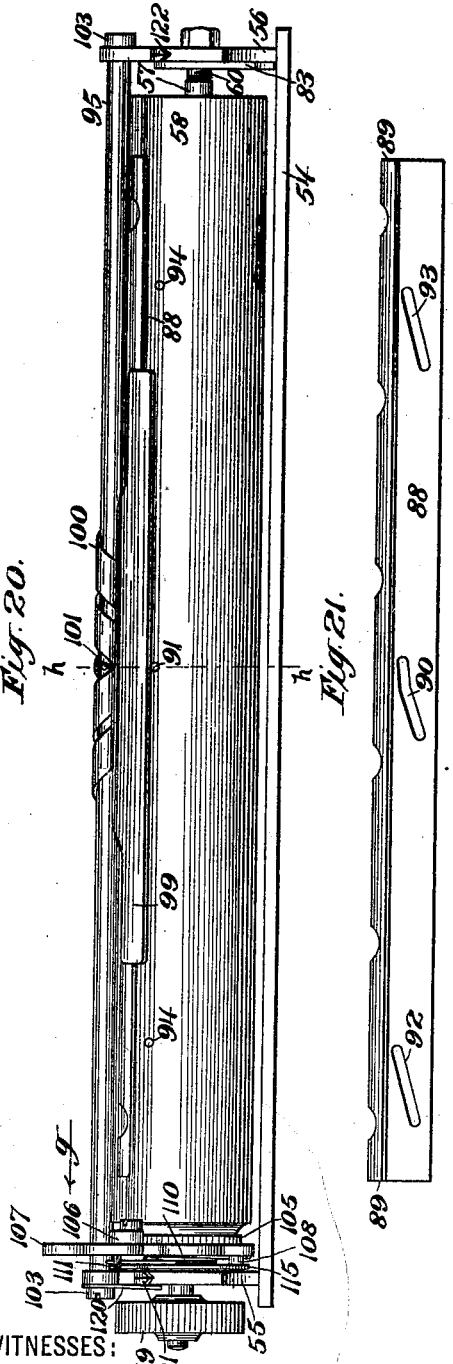
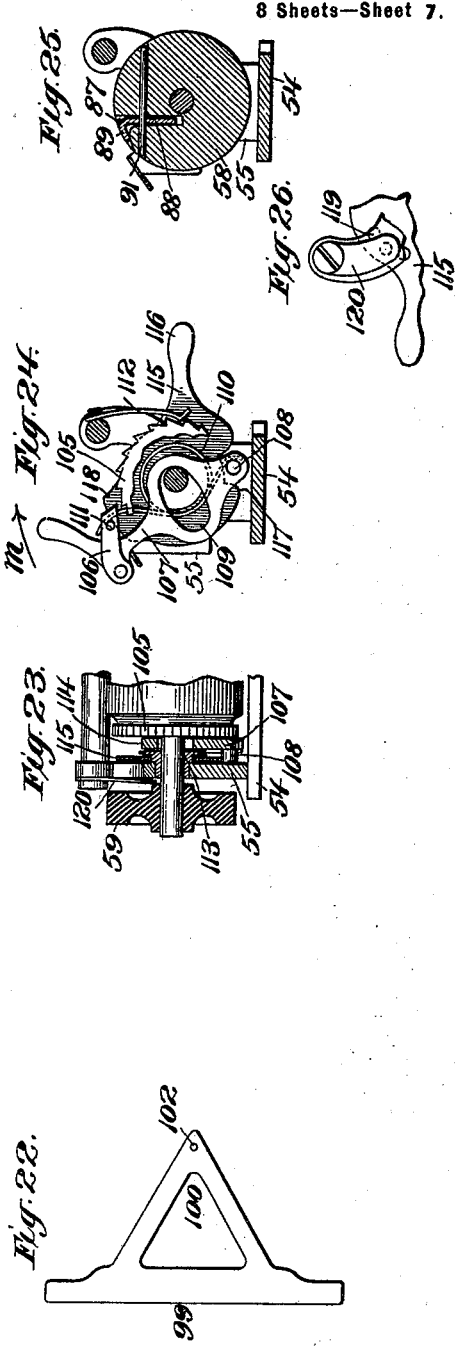
WITNESSES:
Geo. H. Botts
Chas. A. Beard
INVENTOR
Frank Lambert
BY
Edith J. Griswold
ATTORNEY No. 640,208. Patented Jan. 2, 1900.
F. LAMBERT.
TYPE WRITER.
(Application filed Apr. 2, 1898.)
(No Model.) 8 Sheets—Sheet 8.
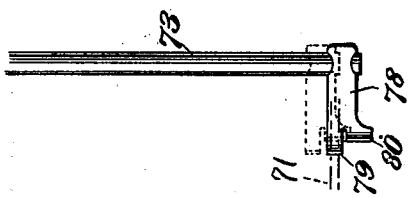
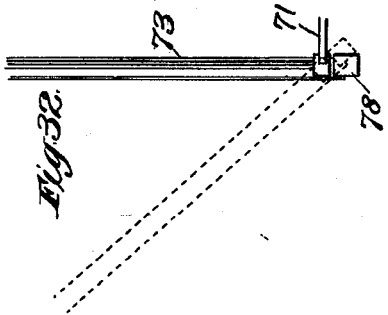
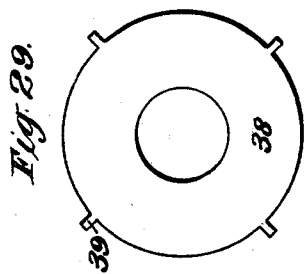
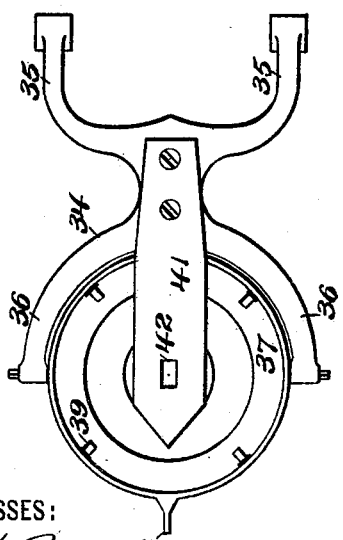
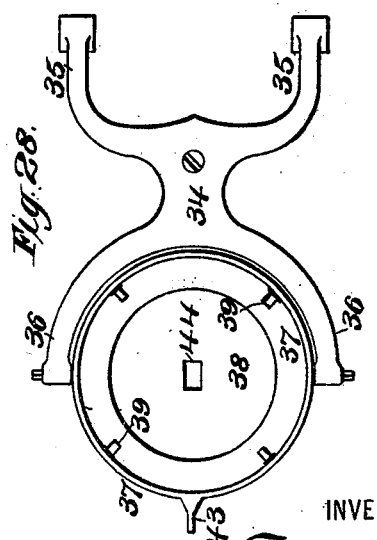
WITNESSES:
Geo H Botts
Chas A. Beard
INVENTOR
Frank Lambert
BY
Edith J. Griswold
ATTORNEY

UNITED STATES PATENT OFFICE.

FRANK LAMBERT, OF NEW YORK, N. Y.

TYPE-WRITER.

SPECIFICATION forming part of Letters Patent No. 640,208, dated January 2, 1900.

Application filed April 2, 1898. Serial No. 676,179. (No model.)

*To all whom it may concern:*

Be it known that I, FRANK LAMBERT, a citizen of the United States, residing at New York, (Brooklyn,) in the county of Kings and State of New York, have invented certain new and useful Improvements in Type-Writers, of which the following is a specification.

My invention relates to that class of typewriters in which there is a multiple key and type controlled by said key. Such a typewriter is disclosed in Letters Patent of myself and Eugene Pastre, No. 607,270, dated July 12, 1898.

My present invention consists more particularly in improvements upon the apparatus set forth in the said patent, hereinafter fully described, and particularly pointed out in the claims.

The principal features of the said improvements are the printing mechanism and the inking-pad attached to a swinging standard pivoted to the base of the instrument so that said printing mechanism and pad can be displaced with the least amount of exertion and smallest possible motion of the standard to permit access to the impression-surface; the arrangement of the type on the type block or ring in staggered relation or in series of two or more circles each and of indexing notches or recesses corresponding thereto; also, the relative arrangement of the staggered type and corresponding recesses and the pressure-points on the key, by reason of which construction it becomes possible to greatly reduce the tilting motion, and hence vibration, of the key and type block or ring when they resume their normal position and to equalize the extent of tilting of the key at every pressure-point; the arrangement of a brake or damper in connection with the key and printing mechanism in order to prevent undue vibration of said parts by reason of their own inertia when they resume their normal position after printing; the construction of the inking-pad self-adjusting to the face of the type and means to equalize at every point the pressure of contact between the face of the pad and the face of the type; the mechanism for actuating the carriage and the device for controlling the same, so arranged in connection with the pivoted standard that it may be operated by the key in various angular positions of said standard; the construction of the tilting key with its face below the center of nutation and with the surface of its pressure-points raised above the face of the key and about in line with said center of nutation, thus increasing the stability of the key and insuring its correct meridional action at the time of tilting; means for adjusting the relative axial position between the printing mechanism and the printing-platen, also the means to control the tilting of the key and prevent a rocking motion of said key about a line drawn through the key-center and the point of pressure when said key is tilted; a device by which the outline of the characters can be printed at right angles or slanting in various degrees either to the right or left to produce variation in the appearance of the printing; an automatic locking device engaging and locking the carriage-spring and gear-actuated mechanism to prevent expansion or unwinding of the main spring when the carriage is removed; a device in connection with the feeding mechanism for feeding the carriage a regular series of steps for varying the relation of said steps as a whole, whereby the printed characters can be ghosted—that is, printed with double outlines—either in a straight or slanting position; the special disposition of indexes and scales to register the position of the printing-point with reference to the printing-line, and the construction of a bell having a free hammer actuated against gravity by the action of the carriage; a resetting-cap for the key with its face of contact below the center of nutation, thus increasing the stability of the key at the time of tilting and reducing the friction and wear to the minimum, and means for adjusting the relative resiliency of the resetting and the brake springs and preventing the cap from rotating on its own axis, together with the combinations hereinafter set forth, and pointed out in the claims.

Figure 2:
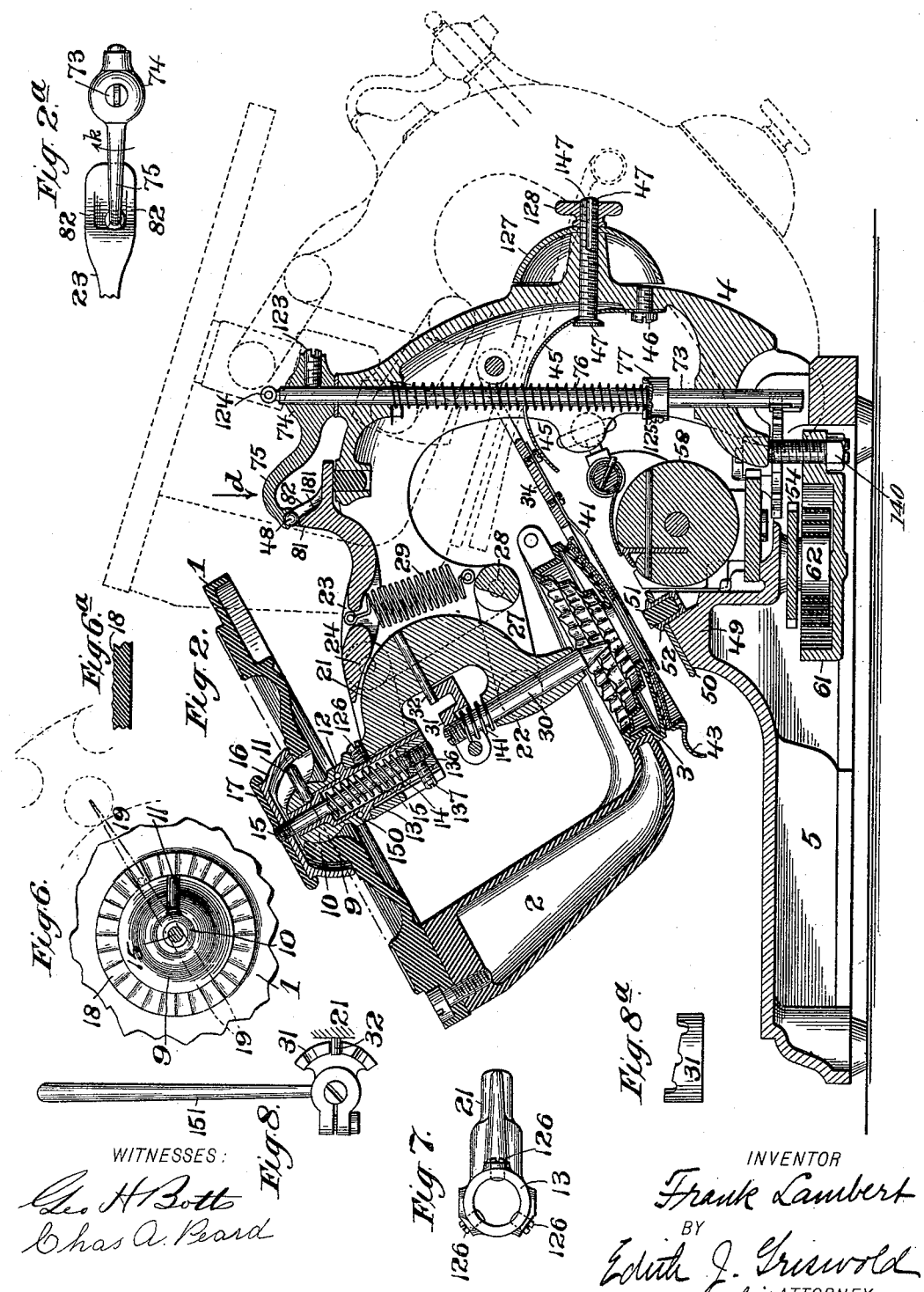
Figure 3:
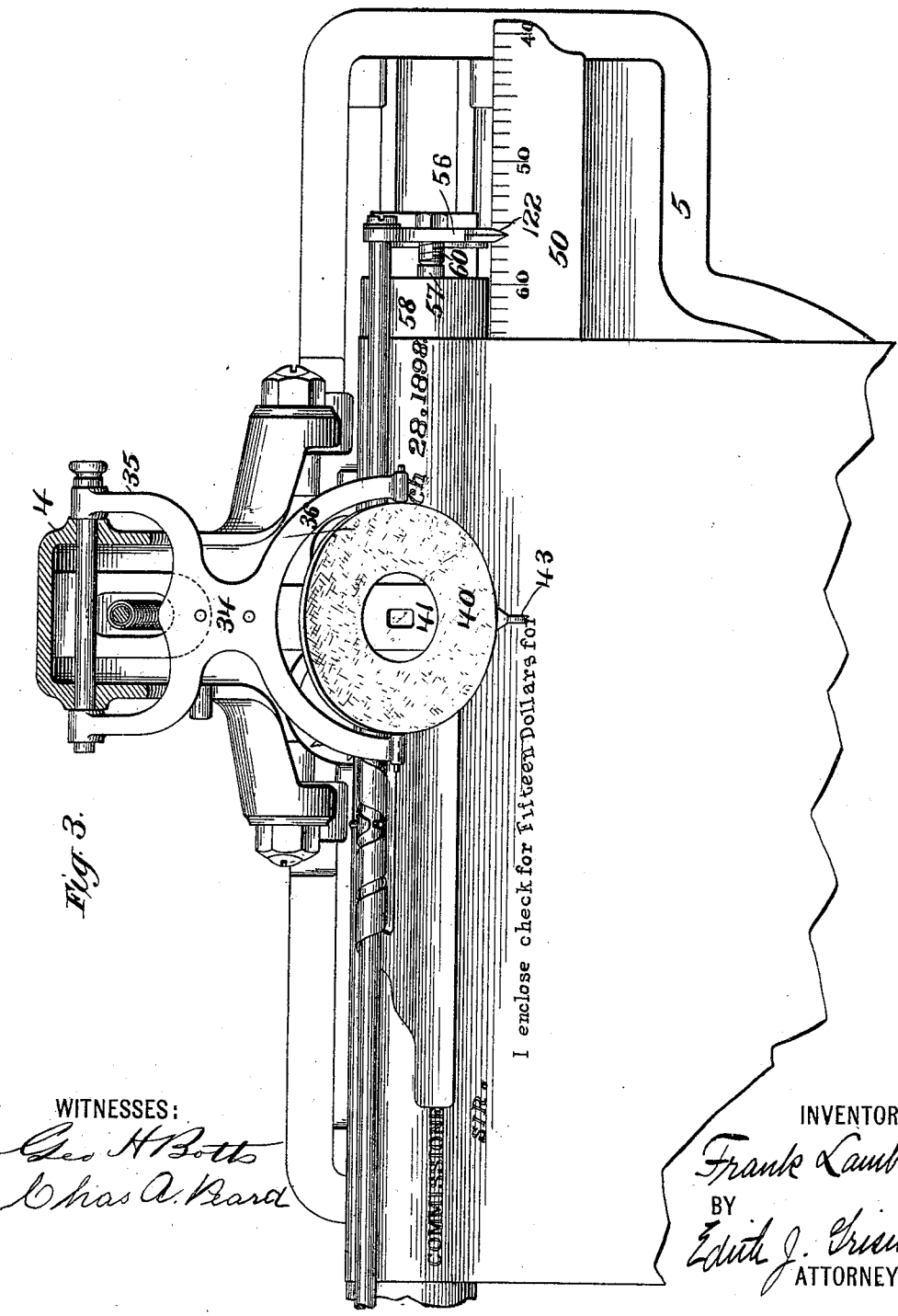

In the accompanying drawings, Figure 1 is a side elevation of the machine. Fig. 2 is a vertical section showing in dotted lines the standard and working parts of the machine thrown back. Fig. 2ª is a plan view of a detail, taken in the direction of arrow *d*, Fig. 2. Fig. 3 is a plan view on the line *a a* of Fig. 1 with the multiple key and associated parts and supports therefor removed and the pivot-shaft of the inking-pad shown in full lines and the standard thrown back. Fig. 4 is also a plan view showing the standard in section on the inclined line *b* of Fig. 1, the multiple key and associated parts and its support being removed as before, but the standard not being thrown back. Fig. 5 is a plan view of the base and lower portion of the standard in section, various other parts being also in horizontal section in order to exhibit their construction, especially illustrating the mechanism for controlling the paper-carriage. Fig. 5ª is a diagram hereinafter referred to. Fig. 6 is a plan view of the central portion of the multiple key, showing corrugations against which the lower edge of the concave cap rests, also indicating by dotted lines the relation of these corrugations to the axial center of the support for the key and the pressure-points on the surface of the key. Fig. 6ª is a section of a portion of the key, showing the outline of the corrugations. Fig. 7 is a plan view of the supporting-sleeve for the multiple key and the arm supporting the sleeve. Fig. 8 is a plan of the cam for shifting from one series of type to another. Fig. 8ª is a side elevation of the cam looking at Fig. 8 from the right-hand side. Fig. 9 is a plan view of the upper surface of the multiple key, the resetting-cap being in place. Fig. 10 is a plan view of the under side of the multiple key and also of the under side of the type ring or block and its supporting-arm. Fig. 11 is a plan view of the inner side of the type-block, showing the recesses. Fig. 12 shows the construction in detail of one of the pressure-points formed by a concave glass disk on the upper surface of the multiple key. Fig. 13 shows a modification in the mode of constructing the pressure-points on the multiple key and exhibits a button or pressure-point pivoted on an axis which is radial with respect to the center of the key. Figs. 12 and 13 are sectional views enlarged. Fig. 14 is an end view of the carriage-standard, showing the catch for retaining the carriage-rack in connection with the pinion. Fig. 15 is a detail view showing a section of the toothed wheel driven by the spring, the pinion actuated by that toothed wheel, the carriage actuated by that pinion, and the pawl which is normally held out of engagement with the pinion by the carriage-rack when in place. Fig. 16 shows the same parts with the carriage absent, the pawl then dropped into engagement with the pinion and preventing the spring from unwinding. Fig. 17 is a plan view of the parts represented in Fig. 16 and also of the escapement-wheel. Fig. 18 is a side elevation of the parts shown in Fig. 17, a portion being in section, taken in the direction of the arrow *e* on Fig. 17. Fig. 19 is a transverse section on the line *ff* of Fig. 17. Fig. 20 is a front elevation of the paper-carriage. Fig. 21 is a detail view showing the bar for clamping the paper removed from the paper-roller. Fig. 22 shows the spring-plate, which holds the paper down upon the roller, detached and separate before it is wound. Fig. 23 is a sectional view of the mechanism on the left-hand end of the roller represented in Fig. 20. Fig. 24 is an end view of said mechanism, taken in the direction of the arrow *g*, Fig. 20. Fig. 25 is a section of the paper-carriage on the line *h h* of Fig. 20. Fig. 26 is a side view of the regulating device for line-spacing located on the carriage. Fig. 27 is a bottom view of the pivoted pad-holder, with the inking-pad and supporting-frame therefor and the perforated shield. Fig. 28 represents a modification of this construction in which the pad-holder for the pad has an opening and the spring-shield is omitted. Fig. 29 is a plan view of the pad-plate. Fig. 30 is a transverse section of the pad-holder with the pad in place. Fig. 31 is a side view of the escapement-rod, the dotted lines showing it in elevated position. Fig. 32 is another view of the escapement-rod, showing the center on which the same is pivoted and the relation of its pivoted center to the escapement-wheel. Fig. 33 is a plan view showing a modification of the locking device shown in Figs. 15 and 16. Fig. 34 is a side view thereof, the locking device being out of engagement; and Fig. 35 is a similar view, the locking device being in engagement.

I will first describe the principal parts of the machine broadly and then take up in succession the various improvements in detail.

The nutating key 1, upon the upper surface of which pressure-points are designated in any convenient way, is supported so that it can be inclined in all directions. Depending from the key 1 is an arm 2, which has at its lower part a socket to receive the type block or ring 3. The spherical outer periphery of the type-block is preferably struck from the center of nutation of the key, and the plane of the key when in normal position is at right angles to the printing-line P L. By the term "printing-line" I mean an imaginary line passing through the center of nutation, through the central axis of the stop 30, and the center of the type-block to the printing-platen. When the key is tilted in any given direction, a type comes into the printing-line and over the printing-platen. Continued pressure of the finger of the operator now moves the key bodily downward, so bringing the type into contact with the printing-platen or the paper at a point directly over the said platen. A down and up or back movement of the key actuates the controlling mechanism, whereby the carriage is permitted or caused to be moved over a unit-space before the succeeding type is imprinted.

It will be seen, therefore, that the printing operation in this machine is substantially the same as that set forth in the aforesaid patent of Pastre and Lambert, No. 607,270, dated July 12, 1898; but, as hereinafter will be shown, in my present device there are in this and other parts of the apparatus many material changes. After the type has been set by the tilting of the key into printing position further bodily depression of the key is in a right line, so that the face of the type is always presented parallel to the face of the printing-platen and not inclined or at an angle thereto. In the aforesaid patent of Pastre and Lambert there is described a construction for accomplishing this result, and in my present device this construction has also been materially changed and simplified. The main supporting-standard 4 is in my present machine pivoted directly to the base 5, so that said standard, with all of the printing and inking mechanism supported by it, may be thrown back into the position indicated in dotted lines in Fig. 2, thus exposing and giving ample access to the paper on the machine.

I will now take up the various improvements in detail.

*The multiple key and its support.*—The key 1 is a disk, preferably of hard rubber, hollowed on its under side so as to be made as light as possible, Fig. 10. The pressure-points on its upper surface may be marked as indicated in Fig. 9. They may consist of buttons 6, Fig. 12, having convex glass faces 7, or they may be of special construction, as illustrated in Fig. 13. This figure shows a pivoted button 8, the upper surface of which may be flat or any other suitable shape, its pivot $8^\times$ lying in a radius drawn from the center of the key. In using the type-writer, if the pressure of the finger on a button is not central to its pivoted line the button will tilt slightly under the finger and cause an equalizing of the pressure on both sides of the pivot, or, in other words, as if the button had been depressed at its center.

*The center support for the key.*—The key 1 is provided with a central socket 9, resting and adapted to be tilted on the ball 10. Projecting from the ball 10 is a rigid pin 11, entering a slot in the socket 9, Fig. 2, thereby preventing rotation of the key upon the ball 10. The ball 10 is bored and, passing over the upper end of the rod 12, engages with the said rod by an indexing clutch device 150, Figs. 1 and 2, formed with interlocking points or projections on the lower part of the ball 10 and a shoulder on rod 12. The rod 12 is received in the supporting-arm 13 and retained there by means of the three adjusting-screws 126, Figs. 1 and 7. Extending through the rod 12 is a smaller rod 15, which is threaded at its upper end to receive the inverted cup 16, which is surmounted with an ornamental plate 17. The lower peripheral edge of the cup 16 bears upon the upper surface of the key 1. Surrounding the rod 15 and within the hollow rod 12 is a spiral spring 14, which bears at one end against a shoulder in the rod 12 and at the other end upon a nut 136 on the lower threaded extremity of the rod 15, so that the effect of said spring is by its expansion to force the cup 16 down upon the upper surface of the said key. When the key is tilted by pressure of the finger upon any one of the pressure-points, the side of the key which rises lifts the cup 16 against the action of the spring 14, and when the pressure is released the spring 14, acting upon the cup, causes the key to return to its normal position. Inasmuch as the lower edge of the cup 16 is a true ring or circle, it will be obvious that if the surface of the key with which that edge makes contact is flat the bearing-point between the key and cup when the key is tilted will be nothing more than a mere point, and thus the key will be free to oscillate or rock slightly on one or the other side of the bearing, and thus not be stably maintained in the necessary direction of tilting. To avoid this, I make the upper surface of the disk beneath the peripheral edge of the inverted cup 16 corrugated, substantially as shown at 18 in Figs. 6 and $6^a$. These corrugations correspond in number to the pressure-points on the surface of the key, and their relation to the several pressure-points is such that lines drawn from the center of a pressure-point and the center of motion of the key will pass between the elevated edges of a corrugation. Such lines are shown in Fig. 6 at 19. The consequence is that the key bears against the under side of the inverted cup 16 when tilted not at one point, but at two points, which points, lying on opposite sides and equally distant from the axis of oscillation, effectually prevent any oscillating movement and so control the action of the key; or, more briefly stated, when the key is tilted the effect of the edges of the elevated corrugations bearing against the peripheral edge of the inverted cup is to retain the key stably in a true meridional direction.

The purpose of the clutch 150, Fig. 1, is to provide means for readily varying the relative angular position between the outline of the type and the printed line, whereby the characters may be printed at right angles or in a slanting direction to vary the appearance of the writing—as, for instance, for printing italicized words. The resetting-cap 16 under the action of the spring 14 normally maintains the clutch 150 closed in whatever position it is moved; but with a slight exertion the key 1 and the ball 10 may be rotated, the clutch immediately locking the ball to the support.

Referring now to Figs. 9 and 10, it will be seen that the characters on the key and type block or ring are shown in a vertical position and will print at right angles to the printed line when the key is in normal position. If, however, the key and ball are rotated in either direction one or more teeth of the clutch, the characters both on the key and on the type-block will assume a slanting position to one side or the other, and the outline of the character will be printed in a more or less angular position in reference to the whole printed line, according to the amount of rotation given the key. The word "Sir" on Fig. 3 represents the letters printed slanting to the right, and the words "Fifteen Dollars" represent the letters printed slanting to the left.

To still further insure the controlling action of the resetting-cap and prevent as much as possible the friction and wear due to the sliding action between the face of the disk and the face of the cap at the time of the tilting of the key, I prefer to drop their line or face of contact below the center of nutation, so that the lifting of the cap, caused by the tilting of the key, is done as much as possible half below and half above the said center of nutation, thus reducing the sliding action and wear between the two faces to a minimum.

In order to adjust the resiliency of the resetting-cap spring 14 and to permit the removal of the cap, and hence of the key, arm, and type-block, I provide a set-screw 137, Fig. 2, which passes freely through a slot of limited length in rod 12 and is threaded in the nut 136. When the set-screw 137 is loosened, the resetting-cap can be revolved in the nut 136, thus permitting either its removal or the adjusting of the tension of the resetting-spring 14. The tightening of the set-screw 137 will lock the nut 136 and prevent the resetting-cap from turning.

*The type-block.*—The type block or ring 3 is clamped, as represented in Fig. 10, within the supporting-arm 2. The lower convex surface of the type-block is preferably struck from the center of nutation of the key as a center. On the bottom face of the block type are found, which are disposed in series, each of two or more preferably concentric rows. The type of one row are disposed in staggered relation to or opposite the intervals between the type of the next adjacent row. The object of this arrangement is to reduce the extent of tilting of the key and type-block. The extent of this displacement or tilting to bring the type into position when the type are placed in two circles (the individual type of one circle being staggered with relation to those of the other) is reduced to about one-half of what it would be if all of the type were arranged in a single large circle. So, also, if the type are arranged in more than two circles there will be a proportionate reduction in the extent of tilting. Therefore by this means I am enabled to reduce the extent of inclination of the key under the pressure of the finger of the operator. Still another advantage follows from the special arrangement of the type with relation to the disposition of the pressure-points on the surface of the key. If these pressure-points, as shown in Fig. 9, are also staggered, and as between two circles of type and the two circles of pressure-points the circle of pressure-points nearest the center of the key correspond to the type of the outer circle on the type-block, while the pressure-points farthest from the center of the key correspond to the type nearest the center of the type-block, the extent of motion to bring each of the type into printing position can be equalized for all the pressure-points. Consequently with a depression of equal extent on the pressure-points the type will travel an unequal extent before they reach their printing position, or, in other words, before they meet the stop 30. The difference of motion between the pressure-points and their corresponding type can be varied by adjusting the relative distances of the type from the center of the type-block to the distances of their corresponding pressure-points from the center of the key. With a fixed stop in the path of motion of the type and type disposed at variable distances from the center of the stop 30 when the key is in normal position the extent of depression on the pressure-points can be equalized to carry any and all the said type into printing position without shifting the position of the stop 30.

*The key-support and type-stop.*—The sleeve 13 is connected by the arm 21 with a sleeve 22. 23, Figs. 1 and 2, is an arm pivoted at 24 directly to the standard 4. Said arm 23 is forked, and the ends of the forks are pivoted to the sleeve 13 at 25. Pivoted to the other sleeve 22 at 26 is the forked arm 27, the other end of which is also pivoted directly to the standard 4 at 28. To the arm 23 is attached a spiral spring 29, Fig. 2, the other end of which is fastened to the standard 4. The arrangement of the supporting-arms 23 and 27 is in result substantially like that set forth in the patent of Pastre and Lambert aforesaid, and its effect is that of the Roberval balance, as fully explained in said application. As a consequence any depression of the key at the center or any other point thereof will cause the key and type to move in a right line, and the pressure will always be the same regardless of the distance of the point of pressure on the surface of the key from the center thereof. Extending through the sleeve 22 is a stop-pin 30, the upper end of which is threaded and adjustably secured in the cam 31. Between the cam 31 and the top of the sleeve 22 is a spiral spring 141, Fig. 2, which tends to move said stop 30 upward in the sleeve 22 and hold the upper surface of the cam 31 against a fixed pin 32 in the arm 21.

Returning now to the type block or ring 3, the concave interior of said block is shown in plan in Fig. 11 and in section in Fig. 2 as stepped in three steps. The peripheral wall of each step is provided with recesses, as shown in Fig. 11. The recesses in each step are alternately deep and shallow radially. This arrangement of the type-recesses corresponds to the staggered relation of the type, to which reference has already been made. To illustrate and taking the recesses of the inner circle, (shown in Fig. 11,) the radially-shallow recesses correspond to the circle of type nearest the center, and the next-radially-deeper recesses correspond to the circle of type next outside the innermost circle, which type are in staggered relation with those of the inner circle. Therefore the recesses, as shown in Fig. 11, provide for six circles of type, or, rather, three series of two circles each. The coöperation of the recesses on the interior of the type-ring with stop-pin 30 is as follows: When the key is tilted so as to bring the type into a given position, a recess corresponding to that type will receive the end of the stop-pin 30, and as that stop-pin is relatively rigid any motion of the type after it has thus been located is prevented. The object, therefore, of this arrangement of type and coinciding recesses is to permit a given number of type to be arranged as close as possible near the center, or, in other words, on the smallest possible circle, while as a further consequence of this, as already stated, there follows a reduced extent of tilting movement of the key, hence of inertia. By means of the arm 151, Fig. 8, the cam 31 may be rotated. This cam 31 (see also Fig. 8ª) is so constructed as to enable the stop-pin 30 to be adjusted and held in three different elevations, so as to adapt it for entering any one of the three series of recesses. It will be noticed, however, that, although in the present device there are six rows of type, but three steps, and consequently three positions of said pin 30, are necessary to accommodate it to all the recesses. The arrangement of the cam 31 with respect to fixed pin 32 forms no part of the present invention, it being fully described and claimed in the aforesaid patent of Pastre and Lambert.

*The standard and the printing device.*—The standard 4 is pivoted to the base 5. Consequently the standard and all the parts carried thereby may be thrown back with respect to the base, as indicated in dotted lines in Fig. 2, thus completely exposing the paper upon which the printing is being done. Also, by reason of this construction of the standard, as will be hereinafter more fully explained, it becomes possible to manipulate the carriage and paper thereon so as to move them laterally while the standard is in any position. The normal angular position of the standard 4 with reference to the base, hence the relative alinement of the central axis of the stop 30 with the printing-platen 51, is regulated by the adjusting-screw 140, Figs. 2 and 18, and check-nut, which is seated in the spring-box 61 and bears against a projection of the standard 4.

Referring now especially to Figs. 3, 27, and 28, 34 is a double-forked support. The forks 35 are pivoted directly to the moving standard 4. Between the forks 36 is diametrically pivoted an annular pad-holder 37, supported in proper relation with the type.

38, Fig. 29, is a thin annular plate having projections 39 on its circumference. On one surface of this plate is attached the inking-pad 40, of absorbent material, Fig. 30. The pad-plate 38, with the inking-pad attached, is placed upon the pad-holder 37. The projections 39 are inserted through openings in the pad-holder 37 and bent over, as shown in Fig. 27. In that way the pad-plate 38 is detachably secured to the pad-holder 37. On the under side of the forked support 34 is secured a leaf-spring 41, Fig. 27, having an aperture 42, which comes opposite the opening in pad-holder 37 and directly in the line of impression. The spring 41 serves as a shield or guard to prevent any other type touching the paper except the one which prints through the opening 42. A modification of this device is shown in Fig. 28, in which plate 38, carrying the inking-pad, has a central opening 44, through which the type acts, as it does through the opening 42 in the spring 41. With the construction shown in Fig. 28 the guard-spring 41 may be omitted. It will be easily seen that the absorbent material can also be directly attached to the annular pad-holder 37, and hence the plate 38 dispensed with.

The object of pivoting the pad-holder 37, carrying the inking-pad, as stated, is to cause the face of the inking-pad to adjust itself automatically to the face of the type. The pad-holder, being diametrically pivoted to the support 34, will permit the pad to tilt on its axis, not only adjusting itself to the face of the type, but also equalizing the pressure at the different points of contact between the face of the pad and the type. The pressure will be more nearly equalized if the points of the pad in contact with the type are nearly equally distributed on both sides of the pivoting-line. Projecting from the circumference of the circular plate 37 is an index-point 43, the use of which will be hereinafter explained. Besides the inertia the action of the springs 14 and 29 in returning the key and printing mechanism to normal position causes a vibration of this key and printing mechanism. To prevent this vibration, I may provide any suitable brake or damper. As shown in the drawings, I have in this case utilized the inking-pad to act as a brake and prevent undue oscillation or vibration between two consecutive tiltings by allowing the support 34 a perfectly free upward action and providing an adjustable spring therefor. A leaf-spring 45, Figs. 1 and 2, bears at one end upon the lever 34 and is secured at its other end at 46 to the inner wall of the standard 4. Adjusting-screw 47 (hereinafter explained more fully) serves to adjust the tension of the leaf-spring 45. The brake is thus disposed so as to act on the type-block, and the construction here shown is preferable, inasmuch as said block has a greater arc of motion than the key or other associated parts when the key is tilted.

*The base.*—The base of the instrument has on its upper side a projecting platen or erasing-table 49, which extends the entire length of the base and serves to support the paper during erasures, &c. It has on its upper inclined surface a plate 50, laid off in suitable divisions, to operate as a guide for spacing the characters in a manner hereinafter to be described. The platen 51 is preferably made of semihard rubber seated in the extremity of the hollow screw 52, Fig. 2, threaded in the table 49. By means of the screw 52 the platen 51 can be caused to protrude more or less from the surface of the table, and thus be adjusted with reference to the type. The center of the platen 51 when the standard is properly adjusted is in line with the center of nutation of the disk—in other words, is in the line of printing—and its face is at right angles to that line, and hence is always parallel to the face of the type which comes down upon it. In the rear of the table and upon the upper surface of the base is a track 53, Figs. 1 and 5, to receive the bottom plate 54 of the carriage.

*The carriage and carriage mechanism.*—The carriage consists of two standards 55 and 56, Fig. 20, which are mounted on plate 54, which standards carry the shaft 57 of the roller 58, which receives the paper to be printed upon. This roller may be rotated by hand, if desired, by means of a milled wheel 59, fast upon one end of it. One end of the shaft of the roller 58 is journaled in the standard 55, while the other end is supported on an adjustable pivot-screw 60 in the standard 56.

I will now describe the mechanism for causing the longitudinal movement of the carriage which causes the spacing between the letters. This will be best understood by reference to Figs. 5, 15, 16, 17, 18, and 19. On the under side of the base 5 is secured a box or spring-barrel 61, having a cylindrical cavity in which is a coiled spring 62, one end of which is fastened to a pin 63 within the box and the other end to the hub 64 of the toothed wheel 65, which is journaled at both ends at 66 in said box 61 and also in the base 5. The action of the spring 62, therefore, when put under tension is to rotate the wheel 65. The wheel 65 engages with a pinion 67, which is journaled to a pin 68, fast in the body of the box 61. The pinion 57 engages with the rack-teeth 69, formed on the rear edge of the carriage-plate 54. The effect, therefore, of the spring 62, acting through the wheel 65 and the pinion 67, upon the carriage is always to move the plate 54, and hence the whole carriage, to the left of the drawing Fig. 5. In order to maintain a control between the movement of the carriage and the movement of the key, I provide an escapement mechanism, which I will now describe. Pin 70 is journaled in box 61 for the purpose hereinafter described. Turning loosely on this pin 70 is a pinion 72, and fast with the pinion is an escapement-wheel 71. The pinion 72 engages with the rack 69, as shown in Fig. 5. A vertical rod 73, Figs. 2, 4, 5, 31, and 32, extends up through the standard 4 and is capable of longitudinal sliding movement and also of partial rotary movement in its bearings in said standard. Upon the upper end of the rod 73 is a hub 74, having a bent arm 75, the turned-down end of which has a ball 48 loosely mounted therein.

This ball 48 rests upon the upper end of a projection 81 at the rear end of the lever 23. The depression of the key 1 raises the rear end of that lever, and so raises the arm 75, and hence the rod 73. This upward movement of the rod 73 is resisted by the spiral spring 76, which surrounds the rod 73 within the standard 4. One end of the spring 76 bears against the inner side of the standard, and the lower end bears upon an adjustable collar 77, fastened by a set-screw 125 on rod 73.

Turning now to Fig. 31, fast upon the lower end of rod 73 is a pallet 78. The end of the pallet 78 is forked, one finger of the fork being longer than the other, and the ends of the fingers are bent over, as shown at 79 and 80. Referring to Fig. 5, it will be seen that the straight face of one tooth of the escape-wheel 71 bears against the upper finger 79 of the pallet. Bearing in mind that the main spring 62 actuates the pinion 72, fast to the escapement-wheel 71, it will be seen that the engagement of the finger 79 with the escapement-wheel 71 will prevent any motion being imparted from the main spring 62 to the carriage 54; but when the finger 79 is moved so as to release the escapement-wheel then the spring will be free to act. By raising the rod 73 in the manner already stated the pallet 78 is carried upward, as shown in dotted lines in Fig. 31; but when the lower finger 80 of the pallet comes in front of that tooth the escape-wheel is free to move forward a slight distance, determined by the difference between the lengths of the fingers of the pallet. When the printing-pressure on the key 1 is relaxed, the rear end of the lever 23, as already explained, is carried downward by means of the spring 29, so returning the lever 23 to normal position. At the same time the coiled spring of the rod 73 forces that rod downward. The finger 80 of the pallet 78 is thus withdrawn from in front of the teeth of the escape-wheel 71; but by reason of the difference in length between the fingers 79 and 80 of the pallet 78 the finger 79 now comes on the rear or inclined side of the tooth, so that there is nothing to oppose the rotation of the escape-wheel 71 over a distance determined by the next succeeding tooth of that wheel coming into contact with the finger 79. This second movement of the escapement-wheel is sufficient in extent to complete the advance of the carriage over a unit-space.

To recapitulate, therefore, when the multiple-key is pressed down to bring the type into print or to make a space between two words it operates to raise the rod 73. The first part of the movement of the rod 73 removes the upper pallet-finger 79 from in front of the tooth of the escapement-wheel 71 and substitutes in place of the finger 79 the shorter finger 80. When the multiple-key, after the printing, is released, the rod 73 then descends, moving the finger 80 out of engagement with the tooth of the escape-wheel 71. Therefore the escape-wheel is free to turn until the next tooth meets the upper finger 79, and as a consequence with one down and one up or return action of the key the carriage is permitted to be moved by the action of the spring 62 a distance equal to a unit-space.

Referring to Fig. 18, it will be seen that the pin 70, carrying the escape-wheel 71, is mounted eccentrically in sleeve 170. A lever 171, secured to the sleeve 170 below the spring-box 61, projects outside of the base 5, Fig. 5. By moving this lever the sleeve 170 is rotated, thereby shifting the position of the center-pin 70 of the escape-wheel 71. Fig. 5ᵃ is a diagrammatic view, enlarged, representing a displacement of the center-pin 70, and consequently the pinion 72, without practically altering the mesh between the pinion and the rack, the rack 54 moving longitudinally with the displacement of the center-pin 70. As before described, the cross-feed of the carriage is controlled by the escape-wheel 71, and therefore this variation of the position of the center of the escape-wheel shifts for each intermittence the starting and stopping positions of this cross-feed in reference to the type or printing line P L. If a character or word is printed and then the carriage set back to the starting position for said character or word and the lever 171 moved to change the stopping position of the cross-feed, if the same character or word is again printed it will not coincide with the first printing, but will be displaced relatively to the first printing, thus making the outline of the character or characters appear in double lines, or, in other words, the printed characters are ghosted. The word "Commisioner," on Fig. 3, is printed double in this way, with the letters at right angles to the printed line, while the word "Sir" is also printed double, the letters being on a slant. The distance between these double lines of the character will be greater or less, according to the throw of the eccentric and the extent of movement of the lever 171.

So far I have explained the automatic operation of the carriage coincidently with the printing operation; but it often happens that it is desirable to move the carriage without at the same time producing impressions upon the paper. This may be done by pressing upon the plate or spacer 17, when the operation of the escapement will be the same as already described, but no type will be brought into printing position, because the key, while bodily depressed, is not tilted. This operation, if repeated, is resorted to in making a blank space of greater or less length between words and sentences. It is often desirable, also, to adjust the carriage longitudinally when the paper and characters already imprinted are in full view, and this happens in the present machine when the standard 4 has been thrown back in the position shown in dotted lines in Fig. 2. It might be assumed that so great a displacement of the standard 4 would result in the removal of the fingers on the pallet 78 from engaging proximity with the escape-wheel 71; but such is not the case, as will be seen by considering Figs. 2 and 32. The axial line about which the standard turns when it is thrown back passes through the center of the standard-pivots 33 and is tangent to the escape-wheel 71, so that while the rod 73 may be inclined, as indicated in dotted lines in Fig. 32, the relative engagement of the fingers with the escape-wheel is practically not varied, and therefore it is possible to actuate the carriage for spacing by the depression of the key when the standard is thrown back, as shown in dotted lines in Fig. 2, with the same facility as when the standard is in normal position. The convenience of this arrangement is illustrated in Fig. 3, from which also the use of the index 43 on the plate 37 will be apparent. If, for instance, the letter "r" in the last word printed on the paper shown in Fig. 3 has been omitted or a letter or space is to be located at the printing-point for any purpose, the standard 4 is thrown back and the carriage then moved until the pointer 43 comes in front of the letter, (or space.) After that the standard may be carried forward, bringing the machine into printing position, and in pressing upon the proper character on the key the letter will be printed at the point indicated by the pointer 43.

In reference to the rod 73, I stated that it has not only a longitudinal movement, but also a rotary movement in its bearings. This rotary movement is effected by the operator pressing against the bent arm 75 in the direction of the arrow $k$, Fig. 2ᵃ, so causing a limited rotation of the rod 73. Thus the finger of the pallet 78 is moved out of engagement with the escape-wheel, when the carriage is free to be slid longitudinally in either direction. The pressure against the arm 75 being relaxed, the pallet again engages with the escapement-wheel and holds the carriage in position. This can be done in the inclined, as well as the normal, position of the standard.

A special point to be noted in this mechanism is the rear end upward projection 81 and its inclined side 181 of the lever 23, Figs. 1, 2, and 2ᵃ. If the arm 75 rested upon a flat surface of the lever 23, the resistance due to the increasing tension of the spring 76 would continue all the time the key was being depressed and the resistance would be greatest at the moment of printing. In the present construction, however, the projection 81 and the inclined surface 181 are so formed that as soon as the rod 73 is lifted sufficiently to clear the finger 79 from the escape-wheel 71 the antifriction-ball 48 rides along the incline 181, and the opposing resistance to the depression of the key is at once reduced. Thus, regardless of the continued rising of the rear end of the lever 23, further uplifting of the rod 73 is reduced or prevented, according to the shape or grade of the inclined surface 181. Therefore the momentum and acceleration of the printing mechanism is increased in proportion to the decrease of the opposing force. By adjusting the tension of spring 76 the resistance or opposing force can be increased at the start of the motion, and by suddenly reducing or suppressing the said resistance due to spring 76 the speed and momentum of the printing mechanism will also be suddenly increased and in proportion to the reduced or suppressed resistance. Consequently the acquired momentum due to this action will add to the power to force the type to print, and it can also be seen that the last part of the motion is accomplished against the will of the operator, the key and printing mechanism practically getting ahead of the finger which was pressing hard on the key at the start of the motion, or, in other words, the effect due to the sudden acceleration of speed. Hence the increase of momentum of this printing mechanism is in all points similar to the action of a hammer-blow.

The spiral spring 76, which surrounds the rod 73, is bent at both ends, its upper end being secured to the inner side of the standard 4 and its lower end to the adjustable collar 77 on the rod 73. That spring acts by expansion and torsion to keep the pallet in engagement with the escape-wheel. The side walls 82, which rise at each side of the projection 81 on the lever 23, Figs. 2 and 2ª, limit the extent of rotation of the rod 73 in both directions—first, against the torsional action of the spring 76 to maintain the pallet in normal engagement with the escape-wheel, and, second, to prevent the operator from turning the arm 75 too far when the pallet is thrown out of engagement.

Referring to the carriage and roller, Figs. 5, 14, and 20, a catch 83 is pivoted upon the standard 56, which catch when thrown downward, as shown in Fig. 14, is in position to engage with the fixed stop 84, projecting from the wall of the table 49, and will prevent the rack 69 from accidentally running out of engagement with the pinion 67. If it be desired to remove the carriage from the machine, the catch 83 is thrown forward to release it from the fixed stops 84 and 85, and then the carriage can be drawn out of its slide by hand. In Fig. 5 the carriage is shown as being drawn out of the machine, the catch having passed the stop 84. In order to prevent the carriage from being pushed accidentally too far from left to right and out of gear, I provide a lug 85, acting as a stop against the face of the carriage-standard 55, the front of which standard 55 projects outward below the top of stop 85.

In order to prevent the sudden unwinding of the spring 62 when the carriage is taken out of the machine, and hence when the rack 69 is moved from engagement with the pinion 67, I may provide a pawl 86, Figs. 15 and 16, which is freely pivoted on the top of the fixed pin 68, on which pin turns the pinion 67. So long as the carriage-plate 54 is in engagement with the pinion 67 the extreme end of the pawl 86, as shown in Fig. 15, rests by gravity upon said plate 54 and is therefore prevented from engaging with the teeth of the pinion 67; but after the carriage-plate 54 has been moved to the left, and hence out of engagement with the pinion 67, then the instant that the last tooth of the rack 69 clears the pinion 67 the pawl 86 is free to fall, as shown in Fig. 16, into engagement with the teeth of the pinion 67, thereby preventing the rotation of said pinion by the action of the mainspring 62, so preventing the sudden unwinding of said spring. When the rack 69 is out of engagement with the pinion 67, the tension of the spring 62 can be adjusted by turning the pinion 67 on its own axis; hence the gear 65 and hub 64. The pawl 86 will in such case act as a winding and retaining pawl, constantly locking pinion 67 while the spring tension is adjusted.

A modification of the device to prevent the unwinding of the spring 62 when the carriage is withdrawn is shown in Figs. 33, 34, and 35. Instead of the pawl 86 I provide a cam 186. This cam has an upwardly-extending spring portion 187, having a downwardly-bent tooth adapted to act as a pawl and engage between the teeth of the pinion 67 when forced downward, as shown in Fig. 35, but to rise out of engagement therewith when released, as shown in Fig. 34. A pin 188 passing through the fixed center pin 68 not only retains the cam 186 and pinion 67 in place, but acts on the spring-tooth 187 as follows: When the rack 54 is leaving the pinion 67, (see Fig. 33,) the standard 56 of the carriage comes in contact with a projection 189 on the cam 186 and partially rotates the cam. This rotation carries the spring portion 187 under the pin 188, as shown in Fig. 35, causing the tooth on this spring portion to engage between the teeth of the pinion 67 to lock the same. When the rack 54 again engages the pinion 67, it turns the pinion the opposite way to the force of the spring 62, and the pinion carries the spring-tooth 187 and the cam 186 with it until the spring portion is free from the pin 188, as shown in Fig. 34. An upward projection 190 on cam 186 coming in contact with the pin 188 limits the rotary motion of the cam 186 when the carriage is removed. As this locking device is positively and automatically operated by the carriage itself the catch 83 can be dispensed with in this modification.

*The paper supporting and holding device.*— The paper is held upon the roller 58 in the following manner: Longitudinally of the roller a deep score or recess 87 is made, which freely receives the bar 88, Fig. 21. The upper edge of this bar is turned or flanged over, as shown at 89. In the middle portion of the bar 88 is a clamping-slot 90, shaped substantially as shown in Fig. 21—that is, with two inclinations. When the bar 88 is placed in the roller 58, as shown in Fig. 25, a pin 91 passes through the roller and the slot 90. The bar 88 can be moved in a longitudinal direction in its recess in the roller 58, and as it is moved the slot 90 rides up on the pin 91, so as to make a separation between turned-over edge 89 of the bar 88 and the surface of the roller 58. Into the space between this edge 89 and the surface of the bar 88 the edge of the paper is inserted, and then the bar 88 is moved to the left of the drawing Fig. 20, thus bringing the flange 89 down upon the edge of the paper, so clamping with even pressure the paper upon the surface of the roller. In order to prevent the tilting of the bar 88 on the pin 91 as a center while the bar is being moved to the right, and so opening the space between the flange 89 and the surface of the roller, I provide two guide-slots 92 and 93 near the ends of the bar 88 and insert pins through the roller and said slots, said pins being parallel to the pin 91. The location of these pins is shown at 94 in Fig. 20. The slots 93 are made larger than the pins 94, so that said slots have some play upon said pins in order that the clamping action of the bar 88 may be controlled only by the slot 90 and pin 91 and not be interfered with by any similar action of the pins 94 in the slots 92 and 93. In this way the parallelism of the flange 89 with the axis of said roller as said flange comes upon the edge of the paper is insured at the time of clamping.

Supported in the upper part of the roller-standards 55 and 56 is a bar 95, Figs. 4 and 20. Upon this bar is placed a sliding stop 96, Fig. 4, which may be held in any desired position by means of the clamping-screw 97. This stop may be adjusted anywhere along the bar and serves to limit the movement of the carriage by striking against a lug 98 of the standard 4, Fig. 4. A paper-clip 99, held by the bar 95, presses upon the top of the roller 58. Fig. 22 shows the blank (on a small scale) that forms this spring-clip 99. The triangular-shaped portion 100 is bent and wound around the bar 95, Figs. 4 and 20, and a pin 101, passing through the bar 95 and the hole 102 in the end of the triangular portion maintains the clip in position. To adjust the tension of this spring-clip 99, the bar 95 is rotated, thereby tightening or loosening the coil 100, the bar 95 being secured by the screws 103.

*The device for rotating the roller.*—The device for rotating the roller and for producing spacing of definite intervals between the lines of printed characters is illustrated in Figs. 20, 23, 24, and 26. On the roller-shaft is a ratchet-wheel 105, with which engages the pivot-pawl 106, which is carried on the lever 107. The lever 107 is pivoted to the roller-standard 55 at 108, Fig. 24, and has in it a slot 109, through which passes the roller-shaft. 110 is a coiled spring surrounding the roller-shaft, one end of which spring bears against the pivot 108 and the other end passes over a pin 111, which extends laterally from the pawl 106. When the lever 107 is pushed backward—that is, in the direction of the arrow m, Fig. 24—the pawl 106, engaging with the teeth of the ratchet-wheel 105, rotates that wheel forward and so turns the roller 58 in a direction away from the operator. When this movement of the lever 107 ceases, the ratchet-wheel 105 is prevented from turning in the reverse direction by means of a spring 112, Fig. 24, which engages with the ratchet-teeth. The lever 107 is, however, then thrown back to its original position, turning on its pivot 108 by the coiled spring 110, this movement being permitted by the elongated slot 109 and ending when the right-hand side of said slot comes against the roller-shaft, as shown in Fig. 24.

I will now describe the device by which, in connection with the mechanism last described, the roller can be set forward a definite number of teeth, as one, two, or three teeth, so as to provide different spaces between the lines. Surrounding the roller-shaft is a sleeve 113, Fig. 23, which sleeve is fast in the standard 55. This sleeve is shouldered, as shown at 114, Fig. 23, and between the shoulder and the standard 55 the sleeve is surrounded by a cam 115, which is free to rotate on said sleeve when moved by the handle 116. Upon the edge of the cam bears the pin 111, fast to the pawl 106. The extent of rotation of the cam 115 is limited by a notch 117, Fig. 24, in the lower part of said cam, through which notch passes the pivot-pin 108 of the lever 107. The operation of this cam is as follows: When the handle 116 is pushed down, so as to bring the right-hand side of the notch 117 against the pin 108, then the edge or corner 118 of the working face of the cam is carried to the right of Fig. 24, so that the pawl 106 is held out of contact with the teeth of the ratchet-wheel 105 over such a distance that when the pawl 106 descends and passes over the corner 118 the pawl can then be moved over a distance only sufficient to make it act on but one tooth of the ratchet-wheel, and so to rotate the roller a corresponding distance. When the handle 116 is moved to its middle position, as shown in Fig. 24, then the pawl is held up by the working face 118 over a certain less distance of its movement, so that when it falls into engagement it is competent to work two teeth, and, finally, when the handle 116 is raised to its full extent the pawl is held up out of engagement with the ratchet for a still less period and when it falls is capable of operating three teeth. In order to hold the cam in either one of its three positions, the upper surface of the cam is indented or countersunk, as shown in Fig. 26 at 119, in three places. On the outside of the standard 55 and carried by the bar 95 is a leaf-spring 120, which has a pin passing through holes in the standard and entering its countersinks 119. It will be seen, therefore, that when the cam is in either of its positions and the countersinks 119 are brought opposite the pin carried by the spring 120 the spring holds the pin in the countersinks, and so prevents accidental rotary movement of the cam.

*The index device.*—On each standard 55 and 56 there is a fixed index-point 121 and 122, Figs. 4 and 20, which points travel over the index or scale plate 50. The scale-plate is marked, as shown in Fig. 4, with two scales, one on each side of its center. The movement of the carriage to the left of Fig. 4 is definitely recognized by the travel of the index 121 over the left-hand scale. If, however, it is desired to indicate the movement of the carriage for a distance greater in length than that of the scale on the left-hand side of Fig. 4, reference is made to the index 122, which moves over the right-hand side of Fig. 4. It will be seen that as soon as the index 121 leaves the left-hand-side-scale indication "40," which figure is marked on both scales, the index 122 commences to indicate onward to the left of figure "40" on the right-hand scale. The object of this construction is to adapt the indicating mechanism to any position of the roller throughout its travel.

*Certain adjustments.*—The rod 73 may be adjusted and timed with reference to the printing mechanism and also with reference to the escapement mechanism which it controls by loosening the set-screw 123 of the arm 75, Fig. 2. It may then be turned on its axis by inserting a pin or piece of wire through the hole 124 in the bar at the upper end of the rod 73, or it can be raised or lowered in its bearings. So, also, by loosening the set-screw 125 in the collar 77 on rod 73 the tension and the torsion of the spring 76 can be regulated. One of the objects of regulating the tension of the spring 76 is to make it sufficiently strong so that the parts controlled thereby will not operate until after the tilting of the key is practically completed.

Referring now to Fig. 2 it will be noticed that the rod 12 at its lower portion fits loosely in the supporting-arm 13, so that it will have a rocking movement therein. Bearing against this rod 12, threaded in the arm 113, are three set-screws 126, Figs. 2 and 7. By adjusting these screws, and therefore tilting one way or the other the central support of the key or rod 12, the key, and type-block, the type-indexing recesses can be adjusted in proper relation to the stop 30 so as to insure the proper alinement of the recesses with the stop 30 and prevent the stop from engaging the wrong recess or to strike between two recesses.

The key-arm and type-block being detachably connected to their support, it is easy to remove them bodily by first removing the cap 16, and this not merely for purposes of repair, but to substitute type-blocks with different type and keys correspondingly marked. Thus an instrument may be provided with interchangeable keys and type-blocks to adapt it to different languages.

The inking-pad in its holder and frame is held in contact with the face of the type by the action of the spring 45, and is self-adjusting upon said face. The holder and frame being freely pivoted and acted upon by the spring 45, it operates, as already explained, as a brake or damper to prevent oscillations or vibrations of the key and printing mechanism.

In my present device, where there are resetting-springs 14 and 29 for the key and the printing mechanism, also a tension-spring for the brake, I provide means of adjusting the relative tension of said springs—namely, the nut 136 on the threaded rod 15 and the screw 47. Hence by means of this nut 136 and the screw 47 the tension of the springs 14 and 45 may be adjusted with relation one to the other and in relation also to the spring 29. The undue vibrations of the key and printing mechanism can thus be greatly reduced or prevented.

By reason of the hinging or pivoting of the standard 4 to the base the whole printing mechanism and inking-pad carried by said standard is bodily displaceable in a direction transverse to the printing-platen. In this way the printing can easily be exposed, and it becomes possible to arrange the mechanism, as already described, so that the carriage-controlling device can always be operated by the key no matter what the position of the standard may be, as it is often very advantageous to be able thus to move the carriage when the printing is exposed to make corrections, &c.

The staggering of the type on the type block or ring and the construction of the interior with recesses of radial varying depths makes it possible for a fixed stop to coact with two or more rows of type, or, in other words, the number of adjustments of the stop 30 is equal to the number of series of type. To illustrate, corresponding to two rows of type staggered and forming one series is one row of recesses of alternately-varying radial depths, and the stop 30 in fixed position is adapted to enter any one of these recesses. So also in the instrument here illustrated six rows of type forming three series correspond to three steps or rows of recesses of alternately-varying depths, and there being three series of type there need be only three adjustments of the stop 30 to enable it to enter any recess of any row. It will therefore be seen that the aggregate number of type of a single series formed of two or more rows of type is equal to the total number of pressure-points on the key and equal also to the total number of recesses in each step or row and that each type of a series is formed on a special radius or semimeridian.

The object of disposing the key with its pressure-points in line with or below its pivot center is to insure steadiness in operation and prevent the rocking motion of the key when the tilting pressure is applied. The same principle is well illustrated by the relative position of the centers of a balance or scale beam.

*The bell.*—The bell 127 is secured to the rear side of the standard as follows: The screw 47 for adjusting the brake-spring 45 passes out at the rear side of the standard. The bell is placed over the projecting end of the screw and secured by thumb-screw 128 screwing on this projecting end. To adjust the screw 47, and thereby the tension of spring 45, I form a slot 147 in the outer end of the screw 47, in which slot a feather projecting into the circular center hole of the bell enters. Therefore by turning the bell the screw is rotated, and when the tension of the brake-spring 45 is properly adjusted the thumb-screw 128 is screwed down, securing in permanent position both the screw 47 and the bell 127. Extending through the standard is a tubular opening 129, Fig. 4. In this opening there is a steel ball 130. The opening is forwardly inclined, as indicated by dotted lines in Fig. 1. The aperture 129 is obstructed by pin 131 to form a seat in which the ball 130 normally rests. On the bar 95 there is a sliding piece 132, which may be secured in any definite position by means of the set-screw 133, Fig. 4, and from this set-screw there projects a spiral spring 135. The stop 132 and the spiral spring are so set on the bar 95 that as the carriage carrying said bar moves the spiral spring strikes the projection 131 first and is bent sidewise. Then as it clears the side of the projection it meets the ball 130, and the spring then expanding shoots the ball up through the tubular opening 129 and so causes it to strike the bell, after which the ball falls back by gravity through the opening and resumes its normal position. Of course by adjusting the stop 132 in any desired position on the bar 95 the bell can be made to sound when desired in any position of the carriage. It will be observed that the bell is practically a free hammer and that no adjustments between the hammer and bell are ever necessary in order to insure a proper sounding of the bell. The ball is always in position to be acted upon by the spring, and when it is acted upon by the spring on its rebound it returns at once to its original place. The construction of this bell is entirely new and original with myself and I do not limit its application to type-writers as herein used.

Having thus described a type-writer embodying in preferred forms the several features of my present invention in combination, what I separately claim, and desire to secure by Letters Patent, is—

1. In a type-writer, a type-block having a spherical exterior with one or more series of type thereon, each series being formed of two or more rows or circles of type, and a stepped interior provided with as many steps as there are series of type.

2. In a type-writer, a type-block having on its exterior a series of two or more rows of type, and on its interior a series of radial recesses of varying depths, the total number of recesses being equal to the aggregate number of type in the said series.

3. In a type-writer, a type-block having on its outer surface two circles of type, the type of one circle being disposed opposite the intervals between the type of the other circle, and on its inner surface a circle of corresponding recesses, the recesses corresponding to the type in one circle being deeper, measured in a radial direction of the ring, than the recesses corresponding to the type of the other circle, the said shallow and deep recesses alternating, substantially as described.

4. In a type-writer, a multiple key having two rows of designated pressure-points, a type-block having two rows of type on its exterior surface, the inner row of pressure-points being marked to correspond to the outer row of type and vice versa, substantially as described.

5. In a type-writer, a nutating key, a support therefor, said key being adapted to be rotated on said support to various predetermined positions.

6. In a type-writer, a key, a type actuated thereby, a spacing-feed, and means to rotate said type so that on two consecutive printings the outline of said type in the second printing will stand at a different angle than the outline of the same said type in the first printing.

7. In a type-writer, a key, a type actuated thereby, a carriage-feed and means by which said type can be brought to print with its outline in various predetermined angular positions relatively to the line of motion of said carriage-feed.

8. In a type-writer, a nutating multiple key, type controlled thereby, a support for said key and means to rotate said key and said type on said support in various predetermined positions, substantially as described.

9. In a type-writer, a nutating key adapted to be rotated, a support for said key, and an indexing-clutch connecting said support and said key, whereby the angle of rotation may be determined.

10. A nutating key and a brake or damper operating to control the vibration of said key, substantially as described.

11. In a type-writer, a nutating key, a type actuated thereby, and a brake or damper operating to control the vibration of said key and said type, substantially as described.

12. In a type-writer, a multiple key, a type-block actuated thereby, a brake or damper acting upon said type-block after pressure on said key has been relieved, substantially as described.

13. In a type-writer, a multiple key, a resetting-spring for said key, and a brake or damper controlling the vibration of said key due to said spring after pressure upon said key has been removed, substantially as described.

14. In a type-writer, a multiple key, a friction brake or damper for said key and means for adjusting the friction of said brake.

15. In a type-writer, a multiple key, a printing mechanism, a resetting-spring for said key and means for controlling the vibrations of said key due to its own inertia and to the resiliency of said spring, substantially as described.

16. In a type-writer, a type-block having a spherical exterior with type thereon and an inking-pad having a corresponding concave spherical inking-surface, the pad being supported so that said concave surface is self-adjusting upon said spherical exterior of the type-block, substantially as described.

17. In a type-writer, the combination of a type-ring, an inking-pad support, inking-pad holder free to tilt in said support, a pad in said holder, said pad extending and coming in contact with the said type-ring across both sides of the tilting-line of said pad-holder, substantially as described.

18. An inking-pad frame, inking-pad holder having an aperture, inking-pad in said holder, said inking-pad holder being pivoted in said frame in a line across said aperture, substantially as described.

19. In a type-writer, the combination of a type-block, pivoted inking-pad support, self-adjustable inking-pad holder pivoted in said support and having a central aperture, inking-pad in said holder, and a type-shield having an opening, the pivoting-line of said pad-holder bisecting said pad-holder central aperture and shield-opening, substantially as described.

20. In a type-writer, the combination of a type-block and standard, with the double-forked support 34, pad-holder 37 diametrically pivoted thereon, pad-plate 38 and pad 40, substantially as described.

21. In a type-writer, a base, a swinging standard pivoted to said base, a multiple key and an equalizing-pressure device for said key directly pivoted to said standard, substantially as described.

22. In a type-writer, the combination with the type-block and standard, of the double-forked support 34, pivoted to the standard, pad-holder 37 pivoted to said support, index 43 and pad 40, substantially as described.

23. In a type-writer, a base having thereon a relatively-fixed printing-platen, a swinging standard pivoted to said base and carrying a printing mechanism, and means for regulating the axial position of said printing mechanism in relation to said printing-platen.

24. In a type-writer, a type-block having two or more series each series being formed of two or more rows of type, an adjustable stop in the path of said type-block, said stop being adjustable in as many positions as there are series of rows of type on said type-block, substantially as described.

25. In a type-writer, a pivotally-supported multiple key, pressure-points raised above the face of said key, the face of said key being below its pivot-center, substantially as described.

26. In a type-writer, a multiple key and resetting-spring therefor, a spring-actuated brake and means for adjusting the relative tension of the said key-resetting spring and the said brake-spring.

27. In a type-writer, a multiple key, a spring-actuated resetting-cap for said key and means to prevent said cap from rotating in its own plane, substantially as described.

28. In a type-writer, a centrally-pivoted multiple key, and pivoted pressure-blocks for actuating said key, substantially as described.

29. In a type-writer, a centrally-pivoted multiple key and pressure-blocks pivoted in said key, the axis of said blocks being radial to the center of said key, substantially as described.

30. In a type-writer, a nutating multiple key, a type-block controlled thereby having on its exterior two circles of type, a circle of recesses within said type-block, every alternate recess being deeper, measured radially of said type-block than the recess intervening, and a fixed stop adapted to enter any one of said recesses when said block is tilted to bring the type corresponding to said recess into printing position, substantially as described.

31. In a type-writer, a multiple key, a type-block actuated thereby, having on its exterior two or more series, each of two or more rows or circles of type and in its interior as many steps as there are series of type, substantially as described.

32. In a type-writer, a nutating key and means for preventing rocking of the key about a line drawn through the key-center and the point of pressure when said key is tilted, substantially as described.

33. A nutating key, a resetting-spring therefor and means to control the tilting action of said key in a meridional line passing through the center of depression when said key is tilted.

34. A nutating key, pressure-points therefor, a support for said key and means to control the tilting action of said key in meridional lines passing through the center of said pressure-points when said key is tilted.

35. In a type-writer, a nutating key, a central support therefor, a spring-actuated resetting-cap concentric with the said key and bearing upon the surface thereof, the plane of contact between the cap and the key being below the center of nutation of said key, substantially as described.

36. In a type-writer, a nutating key, a central support therefor, a spring-actuated resetting-cap concentric with said key and bearing upon the same, the meeting surface of said key and said cap being relatively so formed that when said key is tilted by pressure on one side of the center of nutation there will be two points of contact between said key and said cap on the other side of said center, said points being located on opposite sides of a line drawn through the center of nutation and the center of the pressure-point, substantially as described.

37. In a type-writer, a multiple key, a resetting-spring therefor, a cap actuated by said spring and resting on said key, and an undulating or corrugated surface between said cap and said key, substantially as described.

38. In a type-writer, a multiple nutating key having on its surface a concentric circle of elevations and depressions, and exterior to said circle a series of designated pressure-points, the said pressure-points and said elevations and depressions being so disposed that a central line drawn through the center of any pressure-point on one side of the center of nutation will pass between two of said elevations on the other side of said center, and a spring-actuated resetting-cap concentric with said key and bearing downward upon said circle of elevations and depressions, substantially as described.

39. In a type-writer, a base, a spring-actuated escapement-wheel, a pallet for said escapement-wheel, a movable standard carrying said pallet, said standard being pivoted to said base in the plane of said escapement-wheel, the parts being constructed and arranged to control said escapement-wheel in various positions of the standard, substantially as described.

40. In a type-writer, a base, an escapement-wheel supported on said base, a swinging controlling device for said escapement-wheel, a printing mechanism actuating said controlling device and means of timing said controlling device and said printing mechanism, substantially as described.

41. In a type-writer, a spring-actuated carriage, an escapement-wheel regulating the movement of said carriage, a movable standard and a controlling device for said escapement-wheel carried by said standard, said controlling device, hence said escapement-wheel and said carriage being operative in various relative angular positions of said escapement-wheel and said standard, substantially as described.

42. In a type-writer, a base, a standard pivoted to said base and supporting a printing mechanism, a spring-actuated carriage, an escapement regulating the movement of said carriage, and a controlling device for said escapement carried by said standard and actuated by said printing mechanism, said controlling device being operative in various angular positions of said standard, substantially as described.

43. In a type-writer, in combination with a base, a spring-actuated paper-carriage, and the escapement-wheel 71 regulating the movement of said carriage, the hinged standard 4 and rod 73 thereon, having fingers 79 and 80 engaging with said escapement-wheel 71, substantially as described.

44. In a type-writer, in combination with a base, a spring-actuated paper-carriage, and the escapement-wheel 71 regulating the movement of said carriage, the hinged standard 4, rod 73 thereon, having fingers 79 and 80 engaging with said escapement-wheel and the spring 76 acting upon said rod, substantially as described.

45. In a type-writer, a base having a standard pivoted thereon carrying a printing mechanism and a spring-actuated paper-carriage, in combination with a spring-barrel 61 having attached thereon pinion-center 68, escape-wheel center pin 70 and adjusting-screw 140, substantially as described.

46. In combination with a base, a spring-actuated paper-carriage, escape-wheel 71, pivoted standard 4, rod 73, having fingers 79 and 80, and releasing-arm 75, substantially as described.

47. In a type-writer, a carriage, a spring-actuated escape-wheel for said carriage, a pallet to control said escape-wheel and means to disengage said pallet from said escape-wheel, the said controlling and disengaging action remaining the same in various relative angular positions of said escape-wheel and said pallet, substantially as described.

48. In a type-writing machine, a paper-carriage, feeding mechanism for feeding the carriage a regular series of steps, and mechanism for varying the relation of said steps as a whole, to the printing-point whereby the printed characters can be ghosted, as described.

49. In a type-writer, a spring-actuated paper-carriage, an escape-wheel controlling the movement of said carriage, the said escape-wheel being mounted on an eccentric axis adapted to change the position of the escape-wheel, as and for the purpose set forth.

50. In a type-writer, the combination of a coiled spring, gear actuated by said spring, a rack engaging said gear, the disengagement of the rack from said gear causing the gear to be locked, thereby preventing the unwinding of said spring, substantially as described.

51. In a type-writer, the combination of a coiled spring, gear actuated by said spring and a rack engaging said gear, and a device adapted to automatically lock said gear when the rack is disengaged therefrom, and to automatically unlock said gear by the engagement of said rack and said gear.

52. In a type-writer, the combination of a spring-actuated removable carriage, rack-and-gear connection between said spring and said carriage, with means automatically operated by the removal of said carriage to lock said gear and prevent unwinding of said spring, substantially as described.

53. In a type-writer, the combination with a base and the paper-carriage having the rack-bar 54, the coiled spring 62, gear-wheel 65, pinion 67, escape-wheel 71, pinion engaging with said rack-bar 54, standard 4, and rod 73 having pallet 78 with fingers 79 and 80, substantially as described.

54. In a type-writer, a nutating key, series of type actuated thereby, series of recesses for said type, a stop adapted to engage said recesses and means to adjust in proper alinement said stop and said recesses so as to prevent said stop from entering into the wrong recess or from striking between two recesses when said key is tilted and said type carried into printing position.

55. A nutating key, printing mechanism actuated thereby, a brake or damper to control the vibrations of said key and said printing mechanism.

56. In a type-writer, a nutating key, printing mechanism actuated by said key, a brake or damper to control the vibration of said printing mechanism.

57. In a type-writer, a nutating key, a printing mechanism actuated thereby, a spring opposing the motion of said printing mechanism, and a brake or damper preventing the vibration of said key and said printing mechanism.

58. In a type-writer, a nutating key, two or more rows of type actuated thereby, a relatively-fixed stop for said key and means to carry a type of either row into printing position without shifting the position of said stop.

59. In a type-writer, a tilting key, a stop to limit the extent of tilting of said key over several predetermined angles, and means whereby this extent of tilting is varied at different predetermined angles without moving the said stop.

60. In a type-writer, a nutating key having pressure-points thereon, two or more rows of type actuated by said key, and means to equalize the extent of tilting on said pressure-points to bring a type of either of said rows into printing position.

61. The combination of a standard having a tubular aperture a ball in said aperture, a bell supported at one end of said aperture and means for projecting said ball against gravity through said aperture against said bell, substantially as described.

62. The combination of a standard having an inclined tubular aperture constricted at its lower end, and a ball in said aperture seated by gravity in said constricted end, a bell supported at the other end of said aperture, and means for projecting said ball through said aperture against said bell.

63. In a type-writer having a transversely-moving paper-carriage, a standard having a tubular aperture, a plunger in said aperture, a bell supported at one end of said aperture, and a spring on said carriage constructed to meet said plunger when carried past said aperture by said carriage and to project said plunger through said aperture against said bell, substantially as described.

64. In a type-writer, a type, multiple depressible key, carriage actuated thereby and means to vary and reduce the pressure necessary to depress said key before said type is brought to print, substantially as described.

65. A multiple depressible key, a force opposing the depression of said key, and means to prevent said opposing force from increasing while said key is depressed.

66. In a type-writer, a multiple depressible key, a spring opposing the depression of said key and means to relieve the resistance caused by said opposing spring while said key is depressed, substantially as described.

67. A multiple depressible key, a force opposing the depression of said key and means of reducing said opposing resistance while said key is depressed.

68. In a type-writer, the combination of a removable spring-actuated carriage, rack-and-gear connection between said spring and said carriage, and positive means operated by the removal of said carriage to lock said gear and prevent the unwinding of said spring, substantially as described.

69. In a type-writer, a multiple tilting key having two or more rows of characters thereon, two or more rows of type actuated by said key, a relatively-fixed stop in the path of motion of said type, and means whereby depression of equal extent on all of said characters on the key will cause the corresponding type to move variable distances before being located by said stop.

70. A multiple tilting key, a support therefor, two type actuated by said key, a relatively-fixed stop in the path of motion of said type, one of the said type being at a greater distance than the other from said stop when said key is in normal position and means to carry either and both of said type into printing position without shifting said stop.

71. A nutating key, type and printing mechanism actuated thereby and means to accelerate the speed and increase the momentum of said printing mechanism to force said type to print.

72. In a type-writer, a nutating key, type and printing mechanism actuated thereby, a resistance opposing the action of said printing mechanism and means to suddenly reduce said resistance thereby increasing the force of the blow to force said type to print.

73. A nutating key, series of type and a printing mechanism actuated thereby, means to accelerate the speed and adjust said acceleration, hence the momentum of said printing mechanism, to carry and force said type to print.

74. A multiple key, a printing mechanism, a force opposing the motion of said printing mechanism and means of reducing said opposing resistance while said printing mechanism is in motion.

75. A multiple key, type actuated thereby, a force opposing the action of said type and means to prevent said force from increasing while said type is carried into printing position.

In testimony whereof I have signed my name to this specification in the presence of two subscribing witnesses.

FRANK LAMBERT.

Witnesses:
SAAL ARONSON,
EMILE DE ROUBAIX.